(No Model.)
H. F. ESTABROOK.
BIRD FOOD HOLDER.
No. 382,255. Patented May 1, 1888.
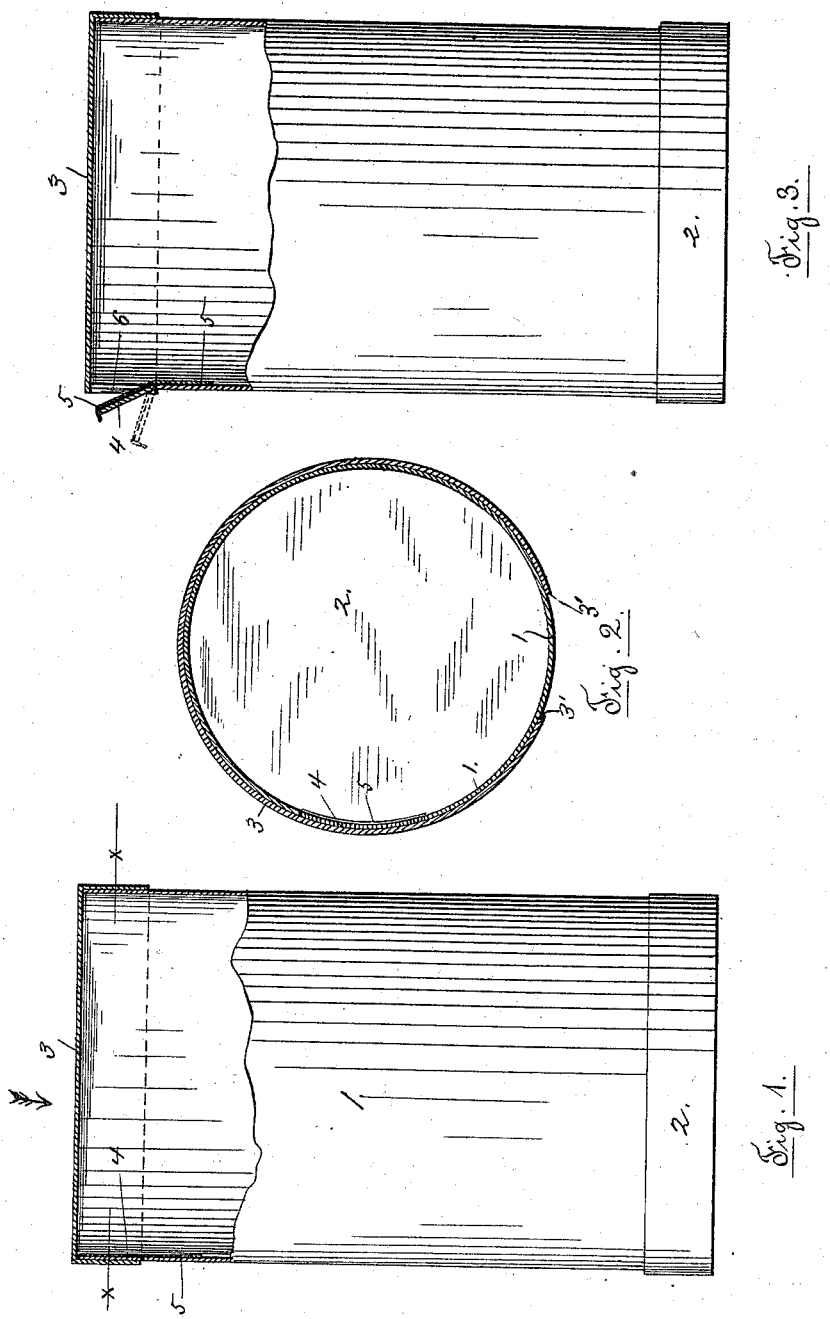
Witnesses:
Chas. F. Schmelz,
Clarence Schofield.
Inventor.
Harry F. Estabrook,
By his Attorney
John C. Dewey.

UNITED STATES PATENT OFFICE.

HARRY F. ESTABROOK, OF WORCESTER, MASSACHUSETTS, ASSIGNOR TO SARAH B. ESTABROOK, OF SAME PLACE.

BIRD-FOOD HOLDER.

SPECIFICATION forming part of Letters Patent No. 382,255, dated May 1, 1888.

Application filed February 24, 1888. Serial No. 265,101. (No model.)

*To all whom it may concern:*

Be it known that I, HARRY F. ESTABROOK, a citizen of the United States, residing at Worcester, in the county of Worcester and State of Massachusetts, have invented certain new and useful Improvements in Boxes; and I do hereby declare that the following is a full, clear, and exact description thereof, which, in connection with the drawings making a part of this specification, will enable others skilled in the art to which my invention belongs to make and use the same.

My invention relates to boxes or canisters in which bird-food or other material is put up. These boxes or canisters are of any desirable shape and have a permanent bottom and a removable top or cover. The seed or other material put up in such box is obtained by removing the top or cover and pouring directly from the box into the dishes or other receptacles. I have found that in pouring out the seed or other material from the box into the receptacles in the bird-cage or otherwise a considerable quantity of the seed or other material does not go into the receptacles, but runs over the top edge of the box and spills on the floor, and is wasted or has to be gathered up, and it is to overcome this and prevent the seed or other material from escaping over the edge of the box that my present invention is designed.

The object of my invention is to improve upon the construction of boxes or canisters as now generally made, in which bird-seed or other material is put up, without adding materially to the cost of their manufacture; and my invention consists in providing the top part of the box or canister with an opening provided with a hinged lip adapted to be moved out or in, and to form a trough for the seed or other material, and also providing a corresponding opening in the cover, all in the manner to be hereinafter fully described.

Referring to the drawings, Figure 1 is an elevation of a box of my improved construction when not in use, the upper part being shown in section. Fig. 2 is a cross-section on the line *x x*, Fig. 1, looking in the direction of the arrow, same figure; and Fig. 3 corresponds with Fig. 1, except that the hinged lip covering the opening in the upper part of the box is moved out, as when the box is ready for use.

In the accompanying drawings, 1 is a box or canister of cylindrical shape, and made of card-board in the ordinary manner, having a bottom, 2, fast thereon, and a top or cover, 3, adapted to be removed from the box or canister 1 entirely, or to be moved or turned around on the upper edge thereof.

The box or canister 1 has an opening, 6, in its upper edge, preferably about an inch wide and half an inch deep. The opening 6 is preferably made by making two cuts or slits in the top edge of the box and then bending out the part or lip 4 between said cuts. A piece of cloth or flexible material, 5, is pasted upon the inner surface of said lip 4 and of the box 1 and acts as a hinge for said lip 4. Said cloth 5 may project over the upper edge of the lip 4 and furnish a means for getting hold of and drawing out the lip 4 without removing the cover 3. In the turned-down edge of the cover 3 an opening, 3', Fig. 2, is made, a little wider and corresponding to the opening 6 in the top edge of the holder 1.

The operation of my improved box for bird-food, &c., will be readily understood by those skilled in the art from the above description, in connection with the drawings, and is as follows: When the box 1 is not in use, the hinged lip 4 is pushed in and the cover 3 moved around on the top edge of the box 1, so that the opening 3' in said cover will not come opposite said lip 4. (See Figs. 1 and 2.) When it is desired to use the box 1 and pour the contents out of the same, the cover 3 is moved around on the top edge thereof until the opening 3' in the turned-down edge of said cover 3 comes directly opposite the lip 4. By means of the projecting end of the cloth 5 the lip 4 is drawn out and down, leaving an opening in the top part of the box, (see Fig. 3,) through which the contents thereof may pass out along the lip 4, which acts as a trough to guide and direct the same into any receptacle. After sufficient of the contents is poured out from the box 1 the lip 4 is pushed in and the cover 3 moved around to close up the opening 6.

It will thus be seen that my improved box for bird-seed and other material is a great improvement upon boxes for that purpose of the ordinary construction now in general use.

I have described my improved box or canister as cylindrical in shape; but, if preferred, it may be made square or other shape in cross-section, and the cover, instead of being moved around thereon, removed and then replaced, to open or close the opening in the top edge of the box.

My invention may equally well be applied to all boxes or canisters made of card-board or similar material, and designed to hold anything to be poured out of the top thereof by removing the cover.

Having thus described my invention, what I claim as new, and desire to secure by Letters Patent, is—

1. As an improved article of manufacture, a box or canister having an opening in its upper part provided with a hinged lip, and a removable cover provided with a corresponding opening, for the purpose stated, substantially as set forth.

2. The combination, with a box or canister having an opening in its upper part provided with a hinged lip adapted to be bent outwardly, of a removable cover to extend over the upper part of said box and inclose said lip, and provided with an opening to correspond with the opening in said box, to permit of the hinged lip being bent outward when desired, substantially as shown and described.

3. The combination, with the box 1, having an opening, 6, in its upper edge, and a lip, 4, hinged thereto to close said opening and adapted to be bent outwardly, of a cover, 3, having a turned-down edge, with an opening, 3', therein to fit over the top part of the box 1, for the purpose stated, substantially as shown and described.

4. The combination, with a box having an opening in its upper part, of a lip, 4, for closing said opening, and a piece of flexible material, 5, for hinging said lip to the box, the upper part of said material extending beyond the edge of said lip 4, to furnish means for drawing the same outward, substantially as shown and described.

HARRY F. ESTABROOK.

Witnesses:
JOHN C. DEWEY,
CLARENCE SCHOFIELD.